J. R. McDONALD.
HEMP BRAKE.
No. 31,899. Patented Apr. 2, 1861.
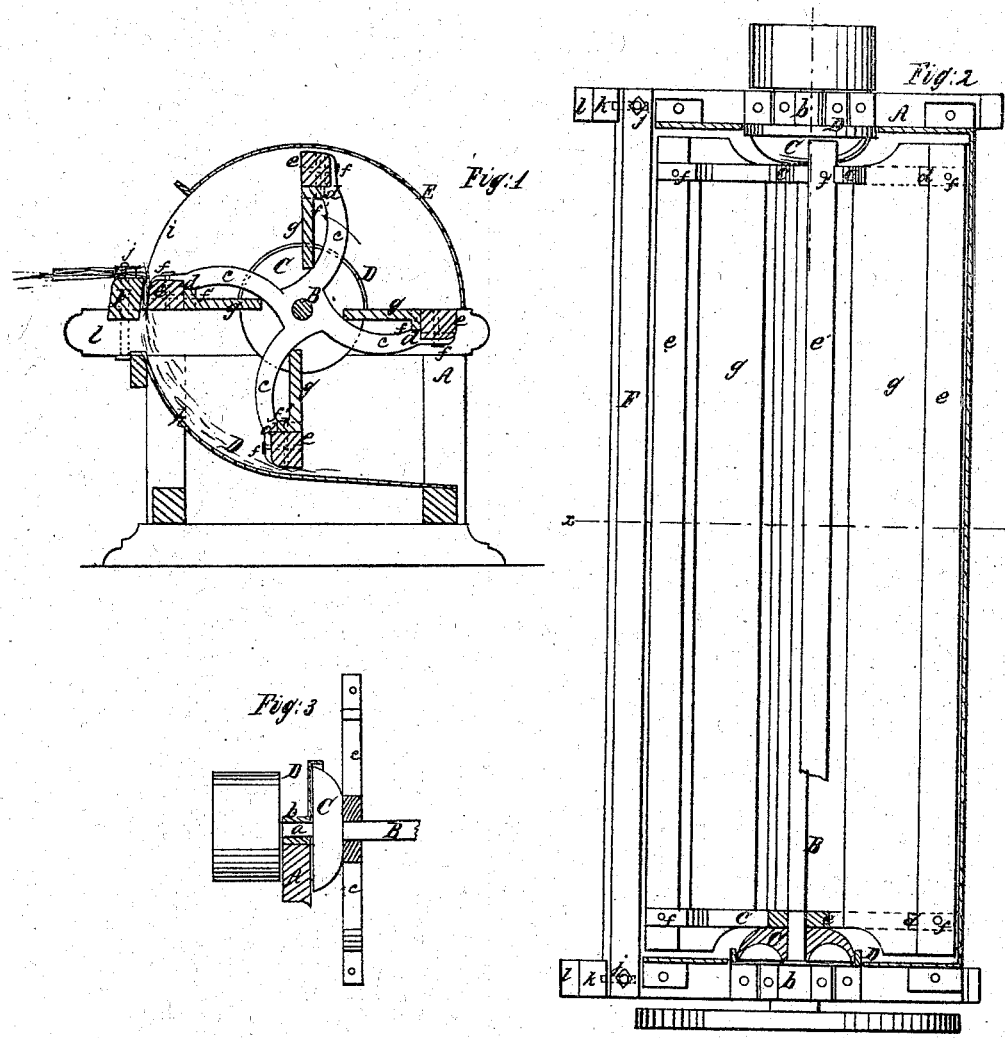
Witnesses
J. W. Coombs
R. S. Spencer
Inventor
J. R. McDonald
per Munn & Co
Attorneys

UNITED STATES PATENT OFFICE.

J. R. McDONALD, OF FAYETTE, MISSOURI.

IMPROVEMENT IN HEMP-BRAKES.

Specification forming part of Letters Patent No. 31,899, dated April 2, 1861.

*To all whom it may concern:*

Be it known that I, J. R. McDONALD, of Fayette, in the county of Howard and State of Missouri, have invented a new and Improved Machine for Breaking and Dressing Hemp; and I do hereby declare that the following is a full, clear, and exact description of the same, reference being had to the accompanying drawings, making a part of this specification, in which—

Figure 1 is a transverse vertical section of my invention, $x\ x$, Fig. 2, indicating the plane of section; Fig. 2, a plan or top view of the same with the cap removed; Fig. 3, a detached sectional view of one of the journals of the revolving beater of the same with its adjoining parts.

Similar letters of reference indicate corresponding parts in the several figures.

This invention relates to certain improvements in that class of hemp-brakes in which a revolving beater is employed, and has for its object the keeping of the journals of the beater free from tow and other substances which have hitherto found their way into the journal-box and impeded the operation of the machine.

To enable those skilled in the art to fully understand and construct my invention, I will proceed to describe it.

A represents a rectangular frame, on the upper part of which a shaft, B, is placed and allowed to rotate freely. The journals $a$ of this shaft are fitted in proper bearings $b$, and on the shaft B, adjoining each journal $a$, there is placed a guard, C. These guards C may be of cylindrical form, or they may be segments of a sphere, their convex surfaces being inward or facing toward the center of the shaft B, as shown clearly in Fig. 2. The upper parts of the guards C are covered or incased by caps D, which are attached to the frame A. The caps D extend upward at the outer sides of the guards, and project over their upper edges, as shown clearly in Fig. 3.

On the shaft B, and adjoining each guard C, there are secured four arms, $c$. The outer parts of these arms are provided with projections $d$, which, in connection with the ends of the arms, serve as bearings for bars $e$, which are secured to the arms by bolts $f\ f'$, which pass through the bars at right angles to each other, as shown in Fig. 1, the bolt $f'$ passing through the projections $d$.

To the arms $c$ and bars $e$ blinds or strips $g$ are attached. These blinds or strips extend the whole length of the bars $e$, and they project down from them a suitable distance, nearly to the shaft B. The face sides of the blinds or strips $g$ are "flush" with the face sides of the bars $e$, as shown in Fig. 1.

In the frame A there is secured a concave, D'. The front part of this concave, as shown at $h$, is concentric with the path of rotation of the bars $e$, the back part being about tangential thereto, as will be fully understood by referring to Fig. 1. The concave extends the whole length of the frame A. On the upper part of the frame A there is placed a cap, E. This cap is a segment of a cylinder, and its back part is in contact with the frame A, a space, $i'$, being allowed at its front end, through which the hemp is fed to the machine. On the front end of the frame A there is secured a bar, F. This bar may be of quadrilateral form, and it is secured to the frame A by bolts $j$, which pass through oblong slots $k$ in the bars $l$ of the frame A. (See Fig. 2.)

The operation of the machine is as follows: The shaft B may be rotated by any convenient power, and the hemp is shoved along over the bar F, the bars $e$ acting upon the hemp, and breaking its woody portion into pieces of greater or less length by adjusting the bar or rest F nearer to or farther from the path of rotation of the bars $e$. The broken woody portion of the hemp is separated from the fibrous portion by the action of the bars $e$ upon it as the hemp passes down the curved part $h$ of the concave. The strips or blinds $g$ effectually prevent the hemp wrapping around the bars $e$ and the guards C, and caps D prevent tow, trash, or other substances working into the journal-boxes $b$.

Having thus described my invention, I claim—

The arrangement of the cap D and guard C with the boxes $b$ and shaft B, as herein shown and described, for the purposes set forth.

J. R. McDONALD.

Witnesses:
 GEO. H. CARSON,
 C. H. STEWART.